United States Patent [19]
Yamamoto et al.

[11] 4,036,767
[45] July 19, 1977

[54] POLYMETHACRYLATE ADDITIVES AND LUBRICATING COMPOSITIONS THEREOF

[75] Inventors: Roy I. Yamamoto, Wappingers Falls; Abraham Morduchowitz, Monsey, both of N.Y.; Wheeler C. Crawford, Houston, Tex.; Carmen M. Cusano, Poughkeepsie, N.Y.

[73] Assignee: Texaco Inc., New York, N.Y.

[21] Appl. No.: 696,151

[22] Filed: June 14, 1976

[51] Int. Cl.² ............................................. C10M 1/32
[52] U.S. Cl. ..................... 252/51.5 A; 252/51.5 R; 260/33.6 UA; 260/878 R
[58] Field of Search ................. 252/51.5 R, 51.5 A; 260/33.6 UA, 878 R

[56] References Cited

U.S. PATENT DOCUMENTS

| | | | |
|---|---|---|---|
| 2,737,496 | 3/1956 | Catlin | 252/51.5 A |
| 2,892,785 | 6/1959 | Harle et al. | 252/51.5 A X |
| 2,892,790 | 6/1959 | Stuart et al. | 252/51.5 A X |
| 3,445,387 | 5/1969 | Liston | 252/51.5 R X |
| 3,657,392 | 4/1972 | Daniels et al. | 260/33.6 UA X |
| 3,816,314 | 6/1974 | Pappas et al. | 252/51.5 A |
| 3,816,315 | 6/1974 | Morduchowitz et al. | 252/51.5 A |
| 3,856,689 | 12/1974 | Hoke | 252/51.5 A |
| 3,879,304 | 4/1975 | Waldbillig | 252/51.5 A |
| 3,892,671 | 7/1975 | Song et al. | 252/51.5 A |

*Primary Examiner*—Delbert E. Gantz
*Assistant Examiner*—Andrew H. Metz
*Attorney, Agent, or Firm*—Thomas H. Whaley; Carl G. Ries; Robert A. Kulason

[57] ABSTRACT

A complex product of 1). an interpolymer of an N,N-dialkylaminoalkyl methacrylamide, $C_1$–$C_6$ alkyl methacrylate, $C_{10}$–$C_{14}$ alkyl methacrylate and $C_{16}$–$C_{20}$ alkyl methacrylate monomers and 2). a liquid poly(alkene-1) of a molecular weight between about 200 and 10,000 prepared by polymerizing the monomers comprising said interpolymer in the presence of said liquid poly(alkene-1). A mineral oil composition of improved viscosity, pour depressing and detergent-dispersant properties and concentrates thereof comprising between about 10 and 95 wt. % mineral oil of a lubricating viscosity and between about 0.1 and 90 wt. % of said complex product.

6 Claims, No Drawings

POLYMETHACRYLATE ADDITIVES AND LUBRICATING COMPOSITIONS THEREOF

BACKGROUND OF INVENTION

Polymeric additives derived from acrylic and methacrylic acids are extensively used in mineral lubricating oil compositions, particularly in automatic transmission fluids and crankcase oils, to impart desirable viscosity-temperature characteristics to the compositions. These additives are designed to modify lubricating oil so that changes in viscosity occurring with variations in temperature are kept as small as possible. Lubricating oils containing such polymeric additives essentially maintain their viscosity at the high temperatures normally encountered in engine and transmission operations while at the same time maintaining a desirably low viscosity fluidity at engine starting temperatures. The ability of the hydrocarbon oil to accommodate increased and decreased temperatures with a minimum change in viscosity is indicated by its Viscosity Index (VI). The greater this ability the higher the VI. Because of the aforementioned properties, these polymeric additives have been conveniently termed both "thickeners" and "VI improvers".

The increasing demands made by the present day engines and automatic transmissions due to increased anti-pollution and performance requirements have created a need for crankcase and automatic transmission fluid additives which have multifunctional properties in order to prevent a build-up of such large quantities of additives required to meet the specification as to pose a danger of a quantity so large as to negatively effect the primary mission of the crankcase oil or transmission fluid. One class of additives that meets this requirement are the N,N-dialkylaminoalkyl methacrylamide, $C_1$–$C_6$ alkyl-, $C_{10}$–$C_{14}$ alkyl-, $C_{16}$–$C_{20}$ alkyl methacrylate interpolymers of a molecular weight of between about $5 \times 10^4$ and $10^6$. These polymethacrylates not only provide improved VI properties to crankcase and transmission oils, but also have the properties of imparting improved dispersancy, low temperature fluidity and antioxidant properties thereto. The compact which principally contributes to the improved detergent and antioxidant properties is the N,N-dialkylaminoalkyl methacrylamide, the improvement generally in a proportional relationship with the methacrylamide content. Since this particular component is relatively costly, there is a continuing search to improve the dispersant and antioxidant properties of these, N,N-dialkylaminoalkyl methacrylamides containing polymers without increasing the methacrylamide content or alternatively producing an interpolymer in which the methacrylamide content can be reduced without an equivalent reduction in detergent and antioxidant properties.

SUMMARY OF INVENTION

We have discovered and this constitutes our invention a complex reaction product of an interpolymer of N,N-dialkylaminoalkyl methacrylamide, $C_1$–$C_6$ alkyl methacrylate, $C_{10}$–$C_{14}$ alkyl methacrylate, and $C_{16}$–$C_{20}$ alkyl methacrylate, and a liquid poly(alkene-1) of a molecular weight of between about 200 and 10,000 wherein the alkene-1 -monomer is of 3 to 12 carbons, prepared by polymerizing the monomeric components of the interpolymer in the presence of said poly(alkene-1) which not only results in a product of good VI improving properties but also a product which has improved dispersant and antioxidant properties when incorporated in automatic transmission and crankcase fluids for a given nitrogen content.

Within the scope of our invention there is also included finished mineral oil compositions containing as a major component (75 to 95 wt. %) mineral oil of a lubricating oil viscosity and between about 0.1 and 10 wt. % of the polymethacrylate-poly(alkene-1) complex as well as concentrates thereof containing 10 to 9 wt. % of the complex and 10 and 90 wt. % mineral oil. Concentrates are formed for the purpose of storage and handling and are blended with additional mineral oil to form the finished compositions suitable for use.

DETAILED DESCRIPTION OF THE INVENTION

More specifically, the interpolymeric polymethacrylate-poly(1-alkene) components in the complex reaction product are present in a weight ratio of polymethacrylate:poly(1-alkene) of between about 4:1 and 2:3. The monomers composing the interpolymer are as follows:

1. N,N-dialkylaminoalkyl methacrylamide characterized by the formula:

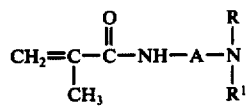

where R and $R^1$ are alkyl to from 1 to 2 carbons and A is a saturated aliphatic hydrocarbon (alkanediyl) of from 1 to 5 carbons.

2. $C_1$14 $C_6$ alkyl methacrylate of the formula:

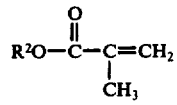

where $R^2$ is alkyl of from 1 to 6 carbons.

3. $C_{10}$–$C_{14}$ alkyl methacrylate of the formula:

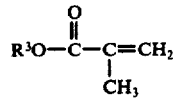

where $R^3$ is alkyl of from 10 to 14 carbons and

4. $C_{16}$–$C_{20}$ alkyl methacrylate of the formula:

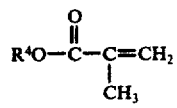

where $R^4$ is alkyl of from 16 to 20 carbons, said interpolymer having an intrinsic viscosity in benzene at 77° of between about 0.1 and 2.5, preferably between about 0.3 and 0.8, a molecular weight (membrane osmometry) of between about 50,000 and $10^6$, preferably between about $10^5$ and $3 \times 10^5$, said interpolymer consisting of between about 1 and 10 wt. % of said N,N-dialkylaminoalkyl methacrylamide, between about 15 and 30 wt. % of said $C_1$–$C_6$ alkyl methacrylate, between about 40 and 60 wt. % of said $C_{10}$–$C_{14}$ alkyl methacrylate and between about 15 and 30 wt. % of said $C_{16}$–$C_{20}$ alkyl methacrylate.

As heretofore stated, the liquid poly($C_3$ to $C_{12}$ alkene-1) of a molecular weight of between about 200 (vapor pressure osmometry) and 10,000 (membrane osmometry) is derived from propylene, butene-1, hexene-1, octene-1, or decene-1 and it is employed as the reaction solvent in which polymerization of the aforementioned alkyl methacrylates is undertaken.

The polymethacrylate-poly(1-alkene) complex reaction product is prepared by standard polymerization techniques with the exception that polymerization of the methacrylate monomers takes place in the presence of the liquid polyalkene as defined in a weight ratio of total methacrylate monomers to polyalkene of between about 4:1 and 2:3, preferably about 2:1. More particularly, the alkyl methacrylate monomers and the liquid polyolefin reaction solvent are charged to a reaction vessel in an individual quantity component amount equal to the component ratios desired in the final complex product. Polymerization is conducted at a temperature of between about 50 and 100° C. in the presence of between about 0.05 and 0.4 wt. % of standard polymerization catalyst such as azobisisobutyronitrile and between about 0.01 and 0.2 wt. % based on the reaction mixture of a standard chain transfer agent such as lauryl mercaptan. Polymerization is continued until all the monomers are consumed, normally measured in terms of refractive index. If the desired degree of polymerization is not attained, additional polymerization catalyst in the aforementioned quantities can be added. Advantageously, polymerizaton is conducted under agitated conditions in the presence of an inert atmosphere such as nitrogen utilizing multiple catalyst additions, e.g., 2 to 5 additions. Under further advantageous conditions, diluent oil may be added during the second or later dose of polymerization catalyst, normally in an amount of between about 0 and 250 wt. % of the reaction mixture. It is to be noted that the termination of polymerization is signified in a particular catalyst addition phase by the refractive index remaining essentially constant.

The exact mechanism by which the improved dispersancy and oxidative stability is achieved by the complex has yet to be determined. However, it is theorized the liquid polyalkene reaction solvent becomes "associated" with the polymethacrylate to increase the solubility of the polymethacrylate in the oil which allows more oxidized materials and particles to be suspended thereon. Such a solvent effect could also be described in terms of a "complex" formed between the polymer and polymerization solvent or in terms of the polymerization solvent as a cosolvent for the polymer and diluent mineral oil.

In preparation of the aforedescribed interpolymer of the complex, specific examples of the N,N-dialkylaminoalkyl methacrylamide contemplated herein are N,N-dimethylaminopropyl methacrylamide, N,N-diethylaminoethyl methacrylamide, N,N-dimethylaminobutyl methacrylamide and mixtures thereof.

Specific examples of the $C_1$–$C_6$ alkyl methacrylate are methyl methacrylate, butyl methacrylate, hexyl methacrylate and mixtures thereof.

Examples of the $C_{10}$–$C_{14}$ alkyl methacrylates are decyl methacrylate, undecyl methacrylate, dodecyl methacrylate, tridecyl methacrylate, tetradecyl methacrylate and mixtures of alkyl methacrylates falling essentially within the defined alkyl carbon range.

Specific examples of the $C_{16}$–$C_{20}$ alkyl methacrylates contemplated herein are hexadecyl methacrylate, heptadecyl methacrylate, octadecyl methacrylate, nonadecyl methacrylate, eicosyl methacrylate and mixtures thereof.

In respect to the above, mixtures of alkyl methacrylate monomers are found when commercial alcohols are used in the monomer manufacture since many commercial alcohols are in actuality a mixture of adjacent and closely adjacent homologs with one or two carbon chain lengths predominating.

Examples of the reaction solvents contemplated are polypropylene of an average molecular weight (m.w.) of about 800 (osmometer), poly(decene-1) of an m.w. of about 580, poly(hexene-1) of a 5000 m.w., poly(octene-1) of a 1000 m.w. and poly(dodecene-1) of an 8,000 m.w.

The mineral hydrocarbon oils of lubricating viscosity contemplated for optional use in the preparation of the poly-methacrylate-polyalkene complex products as well as in mineral lubricating oil compositions containing said products can be derived from a wide variety of hydrocarbon base oils such as naphthenic base, paraffinic base and mixed based mineral oils, e.g. having an SUS viscosity at 100° F. of between about 35 and 1000.

When the finished lubricant compositions are to be employed as automatic transmission fluids, the complex product content is desirably between about 0.1 and 10 wt. % and the mineral lubricating oil base is desirably present in an amount between about 85 and 95 wt. %, advantageously having an SUS viscosity between about 40 and 150 SUS at 100° F., preferably between 50 and 125, the remainder of the transmission fluid composition being composed of standard additives normally found therein. These additional additives are normally supplementary detergent-dispersants, antirust-corrosion inhibitors, supplemental antioxidants and friction modifiers. Examples of such supplementary additives are set forth in U.S. Pat. No. 3,640,872, for example, detergent-dispersants such as the alkenyl substituted succinic anhydride derivative of polyethylene polyamine, e.g. where the alkenyl group is a polybutene of a molecular weight of about 1200, the amine is hexamethylene pentamine; and antioxidants such as phenylnaphthyl amine, phenylenediamine, phenothiazine, diphenylamine; friction modifiers such as modified carboxylic acid, e.g. N-acyl sarcosine compound represented by the formula:

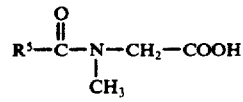

where $R^5$ is an aliphatic radical having from 12 to 70 carbons; antirust and anticorrosive agents such as a mixture of hydrolyzed $C_6$–$C_{18}$ alkenyl succinic anhydride, phenol, mono and di-$C_{12}$ alkylphosphoric acid esters; and friction modifier life extenders such as zinc di(alkylphenoxypolyalkoxyalkyl) dithiophosphates.

The finished lubricating oil compositions contemplated herein which are particularly suitable for use as crankcase lubricants in internal combustion engines would generally comprise between about 75 and 95 wt. % of a hydrocarbon lubricating base oil, preferably of an SUS viscosity between about 95 and 150 at 100± F. and between 0.1 and 10 wt. % of the interpolymer component, the remainder of the engine oil compositions being composed of standard lube oil additives for engines, these additional additives are found in the classes of supplementary detergents, supplementary oxidation inhibitors, corrosion inhibitors and antifoamants, etc.

Some examples of the supplementary detergent dispersants contemplated herein are ethylene oxide derivatives of inorganic phosphorus acid free, steam hydrolyzed, polybutylene (700–5000 m.w.)-$P_2S_5$ reaction product, overbased calcium alkyl aromatic sulfonates having a total base number at least about 300 and sulfurized normal calcium alkylphenolate. These supplementary detergent dispersants are disclosed in U.S. Pat. Nos. 3,087,956, 3,549,534, and 3,537,966.

Examples of suitable engine oil supplementary antioxidants contemplated herein are zinc and cadmium dialkyldithiophosphate and diaryldithiophosphate, the alkylated diphenylamines, sulfurized diphenylamines, unsulfurized and sulfurized alkylphenols and phenolates and hindered phenols.

Examples of suitable engine oil corrosion inhibitors are zinc dialkyldithiophosphate, zinc diaryldithiophosphate, basic calcium and magnesium sulfonates; calcium, barium and magnesium phenolates.

The following examples further illustrate the complex products of the invention and the compositions thereof but are not to be construed as limitations thereof.

EXAMPLE I

This example and Examples II, III and IV illustrate the preparation of the polymethacrylate-polyalkene complex.

To a 4-liter resin kettle equipped with a nitrogen inlet tube, stirrer, heater, cooling fan, thermistor and thermocouple the following materials were charged:

| Materials | Grams |
| --- | --- |
| Dimethylaminopropyl Methacrylamide (DMAPMAD) | 40 |
| Butyl Methacrylate (BMA) | 210 |
| Neodol 25L* Methacrylate (NMA) | 575 |
| Alfol 1620 SP** Methacrylate (AMA) | 175 |
| Polypropylene (~ m.w. 800) | 500 |
| 1-dodecanethiol | 0.4 |

The reaction mixture was purged with nitrogen for a period of one-third hour with stirring and then heated to about 83° and 2 grams of azobisisobutyronitrile (AIBN) were added. After the $n_D$ 54° C (refractive index) became constant, 0.5 grams AIBN were added together with 1130 grams of a mineral oil of an SUS viscosity of about 41 at 100° F. Stirring was continued for one hour at 83° C. and then another hour at 100° C. The resultant product was characterized as a 57 wt. % lube oil solution of a 4:21:57.5:17.5 weight ratio DMAPMAD:BMA:NMA:AMA polymethacrylate interpolymer in complex with polypropylene (~800 m.w.) said complex having a weight ratio or interpolymer: polypropylene of 2:1, said interpolymer component having a molecular weight of approximately $1.8 \times 10^5$ (38 wt. % interpolymer basic product).

The NMA and the AMA monomers described above are respectively derived from Neodol 25L* and Alfol 1620 SP** which are tradenames for technical grade alkanols respectively of Shell Chemical Co. and Continental Oil Co. having the following typical analysis:

| | Typical Properties Approx. homolog Distribution, wt. % |
| --- | --- |
| Neodol 25L* (Synthetic Lauryl Alcohol) | |
| Lighter than $C_{12}$ OH | 4 |
| $C_{12}OH$ | 24 |
| $C_{13}OH$ | 24 |
| $C_{14}OH$ | 24 |
| $C_{15}OH$ | 15 |
| $C_{16}OH$ | 2 |
| Alfol 1620** (Synthetic Stearyl Alcohol) | |
| $C_{14}OH$ and lighter | 4 |
| $C_{16}OH$ | 55 |
| $C_{18}OH$ | 27 |
| $C_{20}OH$ | 9 |

The resultant alkyl methacrylate monomers derived from the reaction of methacrylic acid with these alcohols are in essence a mixture of $C_{12}$ to $C_{16}$ alkyl methacrylates for those derived from Neodol 25L and $C_{16}$ to $C_{20}$ alkyl methacrylates for those derived from Alfol 1620 SP with the same weight percent distribution for a specific alkyl methacrylate as is found in the alcohol mixture. This same weight distribution of the $C_{12}$ to $C_{16}$ and $C_{16}$ to $C_{20}$ methacrylate will also carry over into the interpolymer.

EXAMPLE II

The procedure and equipment of Example I was essentially repeated with the exception of a variation in quantities of reactants and the AIBN catalyst was added in three additions at 83° C. each addition taking place when the refractive index became constant. The materials charged were as follows:

| Materials | Grams |
| --- | --- |
| DMAPMAD | 32 |
| BMA | 168 |
| NMA | 432 |
| AMA | 168 |
| Polypropylene (~800 m.w.) | 400 |
| 1-dodecanethiol | 0.16 |
| AIBN | 1.6 + 0.4 + 0.4 |
| Mineral Oil (~41 SUS at 100° F.) | 1468 |

The product was characterized as a 45 wt. % lube oil solution of a 4:21:54:21 weight ratio DMAPMAD:BMA:NMA:AMA polymethacrylate interpolymer in complex with polypropylene (~800 m.w.), said complex having a weight ratio of interpolymer: polypropylene of 2:1, said interpolymer component having a molecular weight of approximately $1.8 \times 10^5$ (30 wt. % interpolymer basis product).

EXAMPLE III

The procedure of Example I and equipment employed was repeated with the exception of quantities of materials were varied. The materials charged were as follows:

| Materials | Grams |
| --- | --- |
| DMAPMAD | 24 |
| BMA | 176 |
| NMA | 432 |
| AMA | 168 |
| Polypropylene (~800 m.w.) | 400 |
| 1-dodecanethiol | 0.16 |
| AIBn | 2.0 + 0.5 |
| Mineral Oil (~41 SUS at 100° F.) | 1468 | he product was characterized as a 45 wt. % lube oil solution of a 3:22:54:21 weight ratio DMAPMAD:-BMA:NMA:AMA polymethacrylate interpolymer in complex with polypropylene (~800 m.w.), said complex having a weight ratio of interpolymer component:polypropylene of 2:1, said interpolymer component having a molecular weight of approximately $1.8 \times 10^5$ (wt. % interpolymer basis product).

EXAMPLE IV

The procedure and equipment of Example I was essentially repeated with variations occurring only in respect to quantity of materials. The materials charged were as follows:

| Materials | Grams |
|---|---|
| DMAPMAD | 16 |
| BMA | 184 |
| NMA | 432 |
| AMA | 168 |
| Polypropylene (~800 m.w.) | 400 |
| 1-dodecanethiol | 0.16 |
| AIBN | 2.0 + 0.5 |
| Mineral Oil (~41 SUS at 100° F.) | 1468 |

The product form was characterized as a 45 wt. % lube oil solution of a 2:23:54:21 weight ratio DMAPMAD:BMA:NMA:AMA in complex with polypropylene (~800 m.w.), said complex having a weight ratio of interpolymer component to polypropylene of approximately $1.8 \times 10^5$ (30 wt. % polymethacrylate component basic product).

EXAMPLE V

This example illustrates the preparation of a comparative polymethacrylate.

The procedure and equipment employed was the same as in Example I with the exception the polypropylene was replaced with a mineral oil of 145 SUS at 100° F. The quantities of materials charged were varied and the number of AIBN additions was three rather than two, additions taking place when the refractive index became constant. The reaction ingredients employed were as follows:

| Materials | Grams |
|---|---|
| DMAPMAD | 40 |
| BMA | 210 |
| NMA | 575 |
| AMA | 175 |
| Mineral Oil (~145 SUS at 100° F.) | 500 |
| 1-dodecanethiol | 0.4 |
| AIBN | 2.0 + 0.5 + 0.5 |
| Mineral Oil (~41 SUS at 100° F.) | 1130 |

The product was characterized as a 38 wt. % lube oil solution of a 4:21:57.5:17.5 weight ratio DMAPMAD:BMA:NMA:AMA in lubricating oil, said interpolymer component having a molecular weight of approximately $1.8 \times 10^5$.

EXAMPLE VI

This example also illustrates the preparation of a comparative polymethacrylate.

The procedure and equipment of Example I was employed with the exception a mineral lubricating oil of an SUS viscosity at 100° F. of about 145 was substituted for polypropylene and there were three additions of catalyst rather than two additions, the additions taking place when the refractive index became constant. The materials employed in the reaction were as follows:

| Materials | Grams |
|---|---|
| DMAPMAD | 30 |
| BMA | 220 |
| NMA | 575 |
| AMA | 175 |
| Mineral Oil (~145 SUS at 100° F.) | 500 |
| 1-dodecanethiol | 0.4 |
| AIBN | 2.0 + 0.5 + 0.5 |
| Mineral Oil (~41 SUS at 100° F.) | 1130 |

The product was characterized as a 38 wt. % lube oil solution of a 3:22:57.5:17.5 weight ratio DMAPMAD:BMA:NMA:AMA of a molecular weight of approximately $1.8 \times 10^5$.

EXAMPLE VII

This example illustrates the improved oxidative stability and dispersancy for the polymethacrylate-polyalkene VI improver complexes of the invention.

The polymethacrylate VI improvers prepared in representative Example I-IV and comparative Examples V and VI were tested in the Turbohydramatic Oxidation Test. This test is described in Dexron II Automatic Transmission Fluid Specification GM-6137-M, July 1973, of the General Motors Corp.

Six fully formulated automatic transmission fluids were subjected to the aforedescribed test and were identical to one another with the exception the variation of the polymethacrylate VI improvers therein. The fully formulated test formulations are described below:

| Composition, Vol. % | TEST FORMULATIONS | | | | | |
|---|---|---|---|---|---|---|
| | I | II | III | IV | V | VI |
| Mineral Oil (100 SUS at 100° F.) | ← 88.8 → | | | | | |
| Additive Mixture* | ← 8.0 → | | | | | |
| Red Dye, ppm | ← 128 → | | | | | |
| Product of Example | | | | | | |
| I | 3.2 | — | — | — | — | — |
| II | — | 3.2 | — | — | — | — |
| III | — | — | 3.2 | — | — | — |
| IV | — | — | — | 3.2 | — | — |
| V | — | — | — | — | 3.2 | — |
| VI | — | — | — | — | — | 3.2 |

*Boron polyisobutenylsuccinimide reaction product 23 wt. %; Phthalate ester (mainly diisohexyl)phthalate) 14 wt. %; Dioctyldiphenylamine 5 wt. %; Carbonate overbased magnesium petroleum sulfonate 5 wt. %; Zinc di(isobutyl/isoamyl) dithiophosphates 3 wt. %; Phosphosulfurized terpenes 2 wt. %; 2,5-bis(octyldithio)thiadiazole 1 wt. %; Polyisobutylene 1 wt. %; Mineral Oil 46 wt. %.

The results of the above test formulations in the Turbohydromatic Test are reported below:

| TURBOHYDRAMATIC OXIDATION TEST DATA | | | | |
|---|---|---|---|---|
| Test Formulation | Sludge 100 rating = | Varnish Clean | Fill in Forward Clutch Drum | % Pentane Insolubles |
| I | 99.1 | 96.5 | 0 | 0.07 |
| II | 98.3 | 96.9 | 0 | 0.14 |
| III | 97.9 | 98.2 | <1 | 0.87 |
| IV | 96.2 | 96.2 | 0 | 3.95 |
| V | 95.5 | 89.3 | <1 | 0.04 |
| VI | 98 | 98 | 0 | 1.35 |

As can be seen from the above, the polymethacylate prepared in polypropylene reaction solvent produced an ATF fluid composition on an equivalent nitrogen and polymethacrylate component basis had generally superior sludge, varnish and pentane insoluble rating.

We claim:

1. A complex polymethacrylate-liquid poly(alkene-1) product of a polymethacrylate to polyalkene component weight ratio of between about 4:1 and 2:3, said liquid poly(alkene-1) of a molecular weight between about 200 and 10,000 and wherein said alkene-1 is of 3 to 12 carbons, said polymethacrylate of a molecular weight of between about $5 \times 10^4$ and $10^6$ composed of the following monomeric elements:

a. between about 1 and 10 wt. % N,N-diaminoalkyl methacrylamide characterized by the formula:

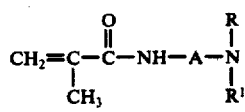

R and $R^1$ are alkyl of from 1 to 2 carbons A is alkanediyl of from 1 to 5 carbons b. between about 15 and 30 wt. % $C_1$–$C_6$ alkyl methacrylate characterized by the formula:

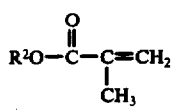

where $R^2$ is alkyl of from 1 to 6 carbons c. between about 40 and 60 wt. % of $C_{10}$–$C_{14}$ alkyl methacrylate characterized by the formula:

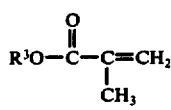

where $R^3$ is of from 10 to 14 carbons, and d. between about 15 and 30 wt. % of $C_{16}$–$C_{20}$ alkyl methacrylate characterized by the formula:

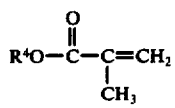

where $R^4$ is alkyl of from 16 to 20 carbons said complex product prepared by polymerizing said monomeric elements in the ratios as defined in the presence of said liquid polyalkene component.

2. A mineral oil composition comprising between about 10 and 95 wt. % mineral lubricating oil and between about 0.1 and 90 wt. % of a complex polymethacrylatepolyalkene product of a polymethacrylate to polyalkene component weight ratio of between about 4:1 and 2:3, said liquid poly(alkene-1) of a molecular weight between about 200 and 10,000 and wherein said alkene-1 is of 3 to 12 carbons, said polymethacrylate interpolymer of a molecular weight of between about $5 \times 10^4$ and $10^6$ composed of the following monomeric elements:

a. between about 1 and 10 wt. % N,N-diaminoalkyl methacrylamide characterized by the formula:

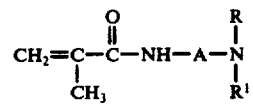

R and $R^1$ are alkyl of from 1 to 2 carbons A is alkanediyl of from 1 to 5 carbons b. between about 15 and 30 wt. % $C_1$–$C_6$ alkyl methacrylate characterized by the formula:

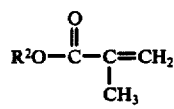

where $R^2$ is alkyl of from 1 to 6 carbons c. between about 40 and 60 wt. % of $C_{10}$–$C_{14}$ alkyl methacrylate characterized by the formula:

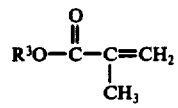

where $R^3$ is alkyl of from 10 to 14 carbons d. between about 15 and 30 wt. % of $C_{16}$–$C_{20}$ alkyl methacrylate characterized by the formula:

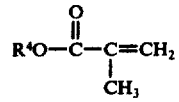

where $R^4$ is alkyl of from 16 to 20 carbons said complex product prepared by polymerizing said monomeric elements in the ratios as defined in the presence of said liquid polyalkene component.

3. A mineral lubricating oil composition in accordance with claim 2 wherein said complex product content is between about 10 and 90 wt. %.

4. A mineral lubricating oil composition in accordance with claim 2 wherein said complex product content is between about 0.1 and 10 wt. %.

5. A complex product in accordance with claim 1 wherein said poly(alkene-1) is polypropylene.

6. A mineral oil composition in accordance with claim 2 wherein said poly(alkene-1) is polypropylene.

* * * * *